(12) United States Patent
Thielen et al.

(10) Patent No.: US 10,229,444 B2
(45) Date of Patent: *Mar. 12, 2019

(54) CONFIGURING AN ELECTRONIC DEVICE BASED ON A TRANSACTION

(71) Applicant: The Nielsen Company (US), LLC, New York, NY (US)

(72) Inventors: Kurt Roman Thielen, Maple Grove, MN (US); Robert Edward Taylor, Newbury, VT (US); Patrick James Sansonetti, Hopkinton, MA (US); Ryan Michael Melville, Chaska, MN (US); James Joseph Alviani, Plymouth, MN (US)

(73) Assignee: The Nielsen Company (US), LLC, New York, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/990,415

(22) Filed: Jan. 7, 2016

(65) Prior Publication Data

US 2016/0117747 A1 Apr. 28, 2016

Related U.S. Application Data

(62) Division of application No. 13/190,056, filed on Jul. 25, 2011, now Pat. No. 9,240,984.

(51) Int. Cl.
*G06F 9/00* (2006.01)
*G06Q 30/06* (2012.01)
(Continued)

(52) U.S. Cl.
CPC ....... *G06Q 30/0621* (2013.01); *G06F 9/4411* (2013.01); *H04L 63/08* (2013.01)

(58) Field of Classification Search
CPC .................. G06F 9/4411; G06Q 30/0621
USPC ........ 341/22; 709/203, 217; 455/435.1, 419; 726/1, 4; 715/735; 713/169, 168; 705/26.44, 1; 725/62; 1/1
See application file for complete search history.

(56) References Cited

U.S. PATENT DOCUMENTS 8,060,414 B1 11/2011 Lin et al.
8,214,880 B1 * 7/2012 Wu .................... H04L 63/0876
379/15.03

(Continued)

OTHER PUBLICATIONS

United States Patent and Trademark Office, "Restriction Requirement," issued in connection with U.S. Appl. No. 13/190,056, dated Oct. 22, 2013, 7 pages.

(Continued)

*Primary Examiner* — Aurel Prifti
(74) *Attorney, Agent, or Firm* — Hanley, Flight & Zimmerman, LLC

(57) ABSTRACT

A first network signal is received indicating a device identifier in response to a transaction involving an electronic device uniquely associated with the device identifier. An entity identifier specific to an entity associated with the transaction is determined. In response to an initialization event of the electronic device, a second network signal from the electronic device is received that identifies the electronic device. In response to the second network signal, a configuration is communicated to the electronic device that is specific to the entity associated with the transaction.

19 Claims, 8 Drawing Sheets

(51) Int. Cl.
*H04L 29/06* (2006.01)
*G06F 9/4401* (2018.01)

(56) References Cited

U.S. PATENT DOCUMENTS

| | | | | |
|---|---|---|---|---|
| 8,925,069 | B2* | 12/2014 | Louboutin | G06F 21/44 |
| | | | | 713/168 |
| 9,240,984 | B2 | 1/2016 | Thielen et al. | |
| 9,589,290 | B1* | 3/2017 | Hipschman | G06Q 30/0621 |
| 2005/0275566 | A1* | 12/2005 | Lahtiranta | G06F 17/30905 |
| | | | | 341/22 |
| 2005/0283410 | A1* | 12/2005 | Gosko | G06Q 30/06 |
| | | | | 705/26.44 |
| 2006/0015520 | A1* | 1/2006 | Lahtiranta | G06Q 30/0603 |
| 2007/0113186 | A1* | 5/2007 | Coles | G06F 9/4411 |
| | | | | 715/735 |
| 2007/0130156 | A1* | 6/2007 | U. Tenhunen | G06F 8/60 |
| 2009/0132682 | A1 | 5/2009 | Counterman | |
| 2009/0138955 | A1 | 5/2009 | Vinayakray-Jani | |
| 2009/0181662 | A1* | 7/2009 | Fleischman | H04W 8/183 |
| | | | | 455/419 |
| 2009/0313466 | A1 | 12/2009 | Naslund et al. | |
| 2010/0042510 | A1* | 2/2010 | Zeinfeld | G06Q 10/087 |
| | | | | 705/26.1 |
| 2010/0154009 | A1* | 6/2010 | Del Sordo | G06F 8/60 |
| | | | | 725/62 |
| 2010/0257363 | A1* | 10/2010 | Kiran | H04N 21/26613 |
| | | | | 713/169 |
| 2011/0252457 | A1* | 10/2011 | Srivastava | H04L 67/16 |
| | | | | 726/3 |
| 2011/0306343 | A1* | 12/2011 | Buford | H04M 1/2535 |
| | | | | 455/435.1 |
| 2012/0023157 | A1* | 1/2012 | Roth | H04L 67/306 |
| | | | | 709/203 |
| 2012/0036552 | A1* | 2/2012 | Dare | H04L 41/0253 |
| | | | | 726/1 |
| 2012/0047227 | A1* | 2/2012 | Haggerty | G06Q 30/06 |
| | | | | 709/217 |
| 2012/0254946 | A1* | 10/2012 | Fleischman | H04L 63/0823 |
| | | | | 726/4 |
| 2013/0031350 | A1 | 1/2013 | Thielen et al. | |
| 2013/0295902 | A1 | 11/2013 | Justen et al. | |
| 2014/0115340 | A1 | 4/2014 | Lee | |
| 2014/0148503 | A1* | 5/2014 | Giangrande | A61K 48/0025 |
| | | | | 514/44 R |

OTHER PUBLICATIONS

United States Patent and Trademark Office, "Non-Final Office Action," issued in connection with U.S. Appl. No. 13/190,056, dated Feb. 25, 2014, 20 pages.

United States Patent and Trademark Office, "Final Office Action," issued in connection with U.S. Appl. No. 13/190,056, dated Oct. 10, 2014, 17 pages.

United States Patent and Trademark Office, "Non-Final Office Action," issued in connection with U.S. Appl. No. 13/190,056, dated Mar. 4, 2015, 15 pages.

United States Patent and Trademark Office, "Notice of Allowance," issued in connection with U.S. Appl. No. 13/190,056, dated Sep. 15, 2017, 25 pages.

\* cited by examiner

CONFIGURING AN ELECTRONIC DEVICE BASED ON A TRANSACTION

BACKGROUND

The present disclosure relates in general to consumer electronic (CE) devices, e.g., customization of devices based on supply chain transactions. A common issue in the CE industry is that an intermediary in the supply chain, such as a retailer, would like to have CE devices customized by the manufacturer for their specific needs. The customization may be relatively minor, such as changing the color of the device, the texture of the finish, the user interface, the feature set, etc., to make the device unique for that retailer. This customization enables the retailer to make claims that their devices that are unique, enhancing the perceived value of the device as compared to devices sold at other retail outlets.

However, customization of products at the factory can cause difficulties for the manufacturer. For example, customization may require changes in the manufacturing process for each retailer. The manufacturer may have to inventory several different stock-keeping-units (SKUs) of a certain product, one for each customized version. These burdens may cause the manufacturer to impose minimum unit requirements and/or customization fees for such services. These fees are often too expensive for the retailer to pay, particularly in view of fierce price competition in the CE retail market.

SUMMARY

The present disclosure is generally directed to customization of devices based on supply chain transactions. In one embodiment, a method involves receiving a first network signal indicating a device identifier in response to a transaction involving an electronic device uniquely associated with the device identifier. An entity identifier specific to an entity associated with the transaction is determined, and in response to an initialization event of the electronic device, a second network signal is received from the electronic device that identifies the electronic device. In response to the second network signal, a configuration is communicated to the electronic device that is specific to the entity associated with the transaction.

In another embodiment, a method involves determining, in response to a transaction involving an electronic device, a device identifier uniquely associated with the electronic device. At least the device identifier is communicated to a provisioning service in response to the transaction. The provisioning service determines an entity identifier of an entity associated with the transaction and configures the electronic device specific to the entity in response to a signal sent to the configuration service from the electronic device.

In another embodiment, an apparatus includes a data storage medium configured during manufacture to store at least a device identifier that distinguishes the apparatus from other apparatuses of the same type. A processor is configured to cause the apparatus to determine an initialization event, and in response to the initialization event, send a network signal to a provisioning service. The network signal communicates at least the identifier. The processor is further configured to cause the apparatus to receive a device configuration in response to the network signal and apply the configuration to the apparatus. The device configuration is specific to an entity in a supply chain through which the device traveled. The device identifier is linked to the entity via the provisioning service in response to a transaction occurring in the supply chain.

The above summary not intended to describe each disclosed embodiment or every implementation detail thereof. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

Figure 1:
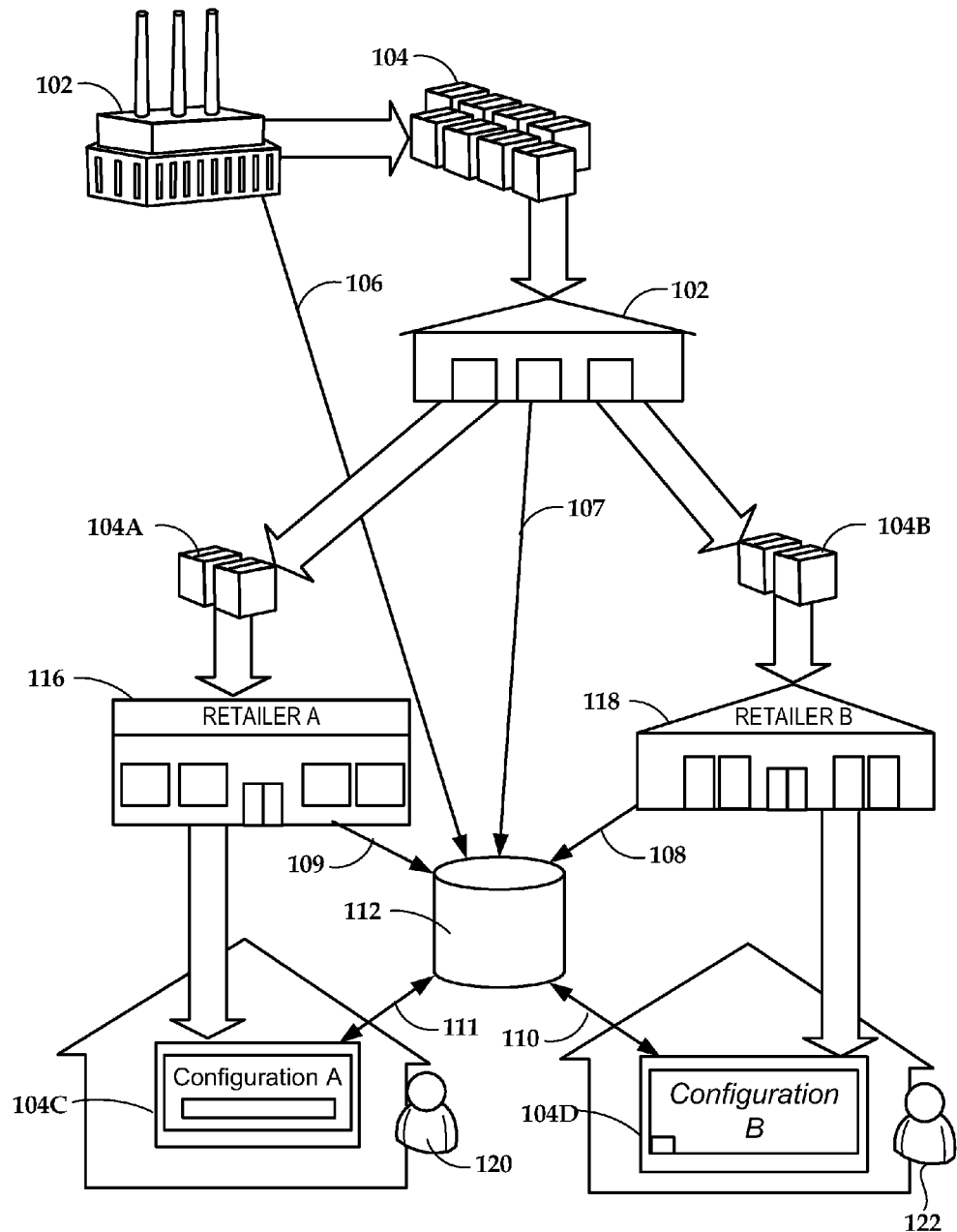
FIG. 1 is a block diagram illustrating a method and system according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the present invention.

The present disclosure is related to systems and methods that facilitate customizing consumer electronic (CE) devices based on the desires of an intermediary, such as a retailer or distributor. For example, an Internet enabled electronic device can be enhanced or customized post-production based on certain criteria learned and obtained during the distribution or retail process. This enhancement may include enabling new services or features, and/or providing a customized experience, e.g., a branded user interface.

Over the last few decades, CE devices have become not only more pervasive, but increasingly sophisticated. For example, even special-purpose devices such as televisions and appliances may have embedded processors with as much processing power as personal computers from decades past. These CE devices may also have other interfaces (such as user and network interfaces) that allow the devices to perform functions commonly associated with personal computers.

While the capabilities of modern CE devices may parallel those of personal computers, consumer expectations of how such devices should operate is markedly different from that of personal computers. For example, while users may be tolerant of the complexity that provides the ability (or need) to highly customize a personal computer, more often than not, they expect a traditional CE device to work right out of the box without any further work beyond the initial setup. Nonetheless, there exists a desire among some to be able to customize a CE device.

For example, most CE devices are produced by original equipment manufacturers (OEMs) that often rely on economies of scale to make devices that are affordable yet powerful and feature-rich. These devices are sold in large quantities to wholesalers or large retailers, and eventually are made available to the end user via a seller, such as a bricks-and-mortar store or Internet retailer. The competition between retailers is fierce, and the popularity of Internet sellers with extremely low margins means that even a large national retailer cannot always depend on price alone to ensure sales volume.

One way in which retailers can distinguish themselves is to provide exclusive devices. For example, in the past, some retailers had OEMs produce a store brand that the retailer alone was authorized to sell. These may have been custom designed products, although often were the same as an existing OEM model but with different branding (e.g., logos, labels, colors, packaging). However, such custom branding can incur significant costs, and may require large quantity orders to keep costs down. Even then, savvy consumers may still be able to detect a rebranded OEM product. Another disadvantage to store branding is that OEMs now spend significant effort in advertising and building goodwill for to their own brands, and it may be redundant (and even counterproductive) for a retailer to repeat that effort for a store brand that is functionally similar to a device branded by the OEM.

Instead of branding the external features of CE device, the present disclosure describes ways that entities in the supply chain can customize the internal state and/or function of a CE device when it is first activated (e.g., powered up) by the end user. This provides the appearance of a customized device, even though right out of the box, the device is substantially the same as other devices of the same type produced by an OEM. The embodiments described below allow CE devices having, e.g., the same model/SKU, to exhibit a different end-user experience due to a different channel of commerce through which the device traveled. The devices may be customized on initial setup and/or in response to any other event, such as initialization of new peripheral, software, service, etc., a software/firmware update, secondary sale or transfer of device, etc.

An example of a system and method that facilitates this device customization according to an example embodiment is shown in the block diagram of FIG. 1. Generally, a manufacturer 102 is able to produce devices 104 that are substantially equivalent, e.g., all having the same OEM model number, version number, etc. The OEM may assign a unique identifier to each of the devices 104, such as a serial number. The identifier may be stored in a data storage medium of the device (e.g., flash memory, radio frequency ID chip, write-once hardware registers, etc.).

Another source of device identifiers can be found in networking hardware. Where devices 104 have built-in network interfaces, such as Ethernet adapter or 802.11-type wireless adapter, the network interface will have a media access control (MAC) address that may be used as an identifier. The MAC address may be universally administered, meaning it is uniquely assigned to a device by its manufacturer, the manufacturer being identified by the first three octets of the MAC address. Therefore, the manufacturer (or a supplier for the manufacturer) may be able to ensure that devices 104 have a unique MAC address fixed in hardware, in which case the MAC address can be used in a similar way as a serial number in identifying a device.

During transactions associated with the devices 104, information about the devices 104 (e.g., represented by signals/paths 106-111) can be learned and associated with the devices 104 via a centralized entity 112, e.g., third-party provisioning service provider. The centralized entity 112 may include more than one apparatus or controlling party, e.g., a distributed entity acting as a single point of control. This association can be established by communicating at least the unique identifier of the devices 104 along with the learned information 106, 111. The learned information can be related to entities along the supply chain, which may include but are not limited to a distributor 114 who distributes the devices 104, the retailers 116, 118 who receive respective subsets of devices 104A, 104B for resale, and the buyers who buy respective individual devices 104C, 104D. The buyers may be the same as or different from end users 120, 122 who ultimately activate devices 104C, 104D.

The transactions that trigger recording of information 106-111 may include any significant event, pre- or post-sale, in which a configuration and/or reconfiguration may be desired. These transactions may include: the device being sold new or remanufactured; service changes related to the OEM 102, retailer 116, 118 and/or service provider 112; changes in the OEM or retailer contact information (e.g., phone number); attachment of a peripheral or other device with which the configured device may interact; device information that requires updating; etc.

The information 106-111 associated with the transaction may include identification of the selling retail channel (brick and mortar store, online, catalog, etc.), date, date range, extended services sold/associated with the device, content service packages, extended warranties, promotional offers, accessories, etc. The learned information 106-111 may vary based on aspects that are not necessarily directly related to the supply chain entities, such as time of transaction (e.g., during trial period, during warranty, after warranty expires), geographic location in which transactions take place, local regulations, or any other criteria that may be learned and associated with the devices 104.

After the devices 104C, 104D are in the hands of the end users 120, 122, the devices 104C, 104D can establish connections with a provisioning service (e.g., the centralized entity 112) in response to an initialization event. The provisioning service 112 can access the learned information, and in response provide information 110, 111 to the devices to configure, enhance, update, and/or otherwise modify the devices based on the desires of the channels through which the device came to the end-users 120, 122. The modifications may include modifying the user interface or any graphics or text placed on screens, skins (e.g., a graphical theme applied to user interface components), reposition of content service, phone numbers, logos, name of service offerings, ability to add new features or applications, addition/removal of content services (trial or permanent), addition/removal of features of the device, enabling/disabling features of the device (e.g., affecting license fees), enabling/adding promotions, language/internationalization, etc.

It is to be understood that the end users 120, 122 may also participate as intermediaries in the supply chain. For example, consider a company that installs electronic signage in buildings using commercially available televisions for displays. The company may purchase large quantities of televisions from a distributor and, depending on business arrangements with customers regarding the devices (e.g., sell, lease), the company may be considered a reseller or an end user. The company may need each television to be set up in a particular way, and it could be time consuming to do so manually. In order to facilitate automatic configuration, the company could establish an account with the centralized entity 112 and register each television set purchased, e.g., using an optical scanner at a receiving dock. Thereafter, once the televisions are physically installed on-site, they may be automatically configured as desired after being powered on and connecting to a network. In such a case, the company may register a wide variety of television models that they use for different types of installations. This could provide additional efficiencies, e.g., avoid having to train installers on how to configure different models of televisions.

As described above, the initialization event that triggers information 110, 111 being sent to configure devices 104C, 104D may at least include a first power-on event and/or connection to a local network. This initialization event may include any events that are detected by the devices 104C, 104D, or detected elsewhere and communicated to the devices 104C, 140D, either via the provisioning service 112 or by an out-of-band communications mechanism. For example, the event may be triggered by a change in information (e.g., an OEM's or retailer's phone number, device information), a change in a configuration of the device, the device becoming Internet enabled, device changing the type of connection, device being connected via a different service provider, new content services being offered, installed or enabled in the device, new devices/peripherals are attached to the device (e.g. a new WiFi module, a new gaming device, etc).

The system and method shown in FIG. 1 allows manufacturers 102 to produce a single SKU in a common way for multiple retailers 116, 118 while still providing a way for the retailers 116, 118 to customize the product post-manufacturing, post-distribution, and/or after the product has been sold through the retail channel. The retailers 116, 118 can identify which devices have been sold through their channel and share the information with a provisioning service 112 which in turn manages the customization of the device. The provisioning service 112 could be provided, in whole or in part, by the manufacturer, the retailer or any other third party service provider.

Figure 2:
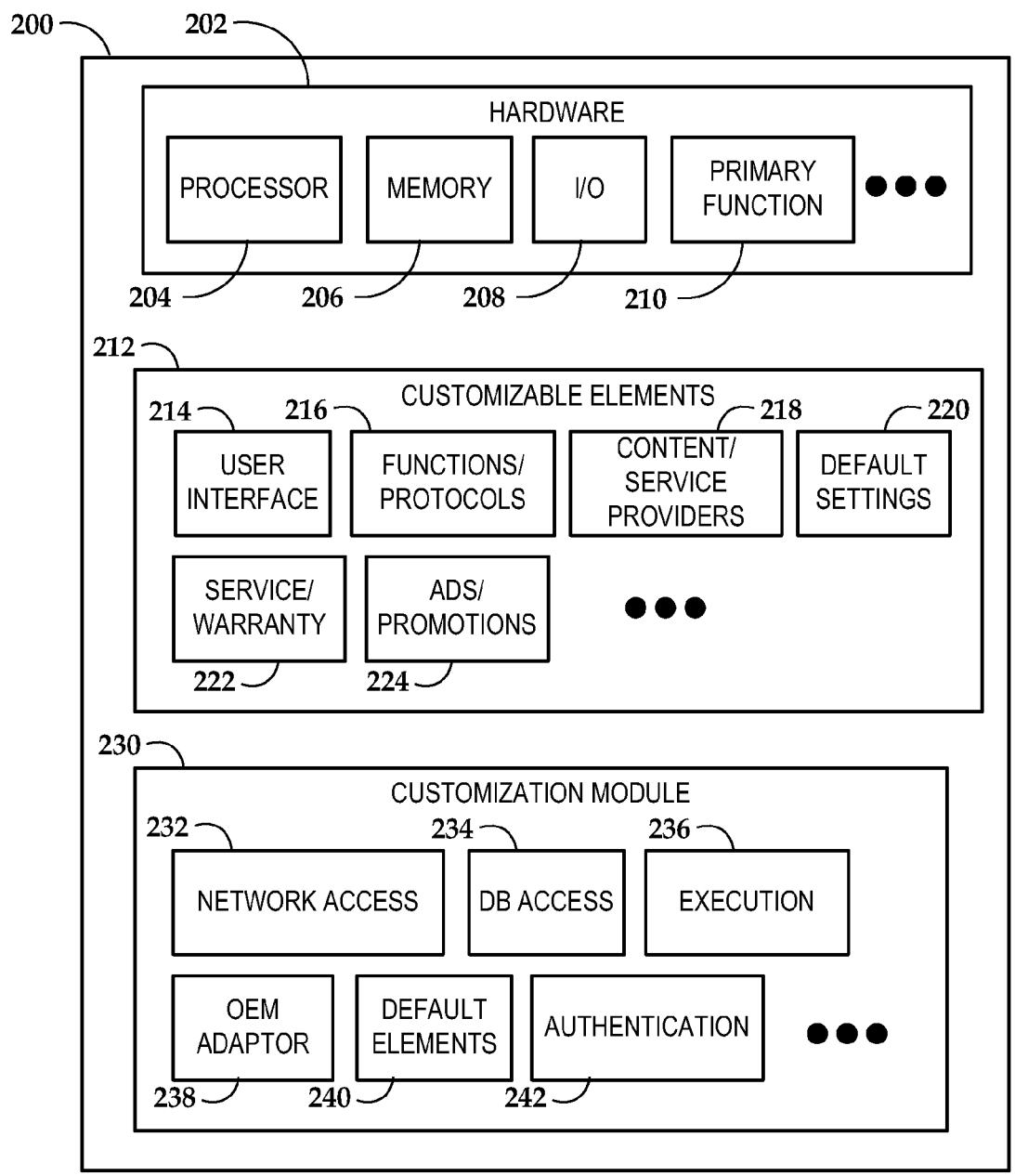
FIG. 2 is a block diagram of a consumer electronic device according to an example embodiment.

In reference now to FIG. 2, a block diagram illustrates functional components of a CE device 200 according to an example embodiment. This diagram is intended to illustrate general functional components and interactions for purposes of the discussion hereinbelow, and is not intended to limit the embodiment to the listed functions/features. The device 200 includes hardware components 202 such as a processor 204, memory 206, and input/output (I/O) circuitry 208, that may perform special-purpose or general-purpose computational tasks. The memory 206 may include both volatile and non-volatile memory, the latter usable to store programs and data (e.g., unique identifier of device 200 that can be recorded on the memory 206 during manufacture).

The hardware 202 may also include specialized components for providing a primary function of the device, as indicated by block 210. This component 210 may be considered part of or separate from the I/O circuitry 208, and may perform functions such as display, sound, sensors, tuners, signal processors, conditioning circuitry, power supplies, motors, etc. These functions may be those commonly associated with the device 200. For example, if the device 200 is a television, the functions may include hardware for display, sound reproduction, tuning, signal processing, switches for accepting user input, etc.

Various aspects of the functional components 210 (as well as other components of the hardware 202) may be amendable to being customized according to the desires of an intermediary in the supply chain. These customization options are represented here by customizable elements 212. The elements 212 may include any combination of hardware, executable instructions, firmware, configuration data, content, etc., that can be selectably activated, deactivated, and/or modified to provide an experience for the particular device 200 that distinguishes it from other devices of the same type, e.g., having the same model number.

For example, element 214 relates to customization of a user interface. The user interface element 214 can provide many aspects of custom branding, e.g., emphasizing that the device 200 is special based on the channel of commerce by which it arrived compared to the same model that might be obtained elsewhere. For example, where the device 200 has display hardware, the user interface component 214 may be used to affect such features as colors, graphics/logos, fonts, languages, menu structures, etc. The user interface component 214 may also be used to affect other user interface features, such as sounds, buttons/switches, force-feedback devices, indicator lights, etc.

The user interface component 214 may also be used to modify, activate and/or deactivate certain functions/features at least by prevent a user from accessing them from the provided user interface. Others of the elements 212 may also provide a similar function independently of the user interface. For example, element 216 may be able to activate/deactivate certain hardware functions, e.g., by writing to a register. The actions associated with the element 216 may also extend to activating/deactivating software features such as protocols, codecs, drivers, etc., that may be dedicated to or separate from the hardware functions. For example, if the device 200 has a microphone, the element 216 may be able to selectively enable/disable the microphone, as well as enabling/disabling voice recognition software that uses the microphone, e.g., to process voice commands.

Element 218 represents configurable content and/or service providers that may be associated with the device. For example, a device 200 such as a television may have certain content stored such as pictures, videos, music, etc. This content may be for purely demonstration purposes, and/or may have another purpose (e.g., video instruction manual). Similarly, service providers may provide similar content over a network, and may provide other data services known in the art. Example provider services include streaming media, news, weather, cloud data storage, channel listings, etc. The activation of these services and/or content could be contingent on a purchase that happened contemporaneously with the purchase of the device 200.

Element 220 represents default settings of the device 200 that may be customized. These settings may be available in any device of this type, but element 220 could set some settings different than the manufacturer's for purposes of convenience, e.g., starting with a default language/locale corresponding to a geographical location where the device 200 was sold. This may also tie in to other services/devices that were purchased with the device 200 (or beforehand, e.g., from the same retailer). For example, if the device 200 was a television that was purchased together with (or after) a set top box, universal remote, and HDMI cable, the defaults for the television and set-top box could be set to utilize the HDMI inputs/outputs at startup, and the remote could be programmed to default to the correct codes that will enable to remote to operate the television and set-top box.

Also pertaining to the purchase of the device 200, certain warranty and service information could be enabled via element 222. This element 222 could configure a status screen that shows date of purchase, location of purchase, show/store a copy of the receipt, indicate remaining warranty period, etc. The element 222 could also be configured to show access to extended warranties, service contracts, etc., that were purchased with the device. In another example, the element 222 could customize user interfaces to display phone numbers, uniform resource locators (URLs), etc., for obtaining service in case of a malfunction.

Element 224 represents configurability of advertising/promotions that may be made available via the device 200. For example, the device 200 may have a service enabled via element 218 that provides special offers by the retailer from which the device 200 was purchased. The component 224 could be used to activate limited time (e.g., expires 30 days from purchase) offers, and be regularly updated to provider continuing offers via the service.

In order to provide customization according to any of the elements 212, the apparatus 200 may include one or more functional modules, as represented by customization module 230. Generally, the customization module 230 receives signals, e.g., via a network, having information that instructs the module 230 to perform an operation on one or more customizable elements 212. These signals may received in response to a event detected/triggered by the apparatus 200, such as initialization of the apparatus 200, although similar information may communicated any time during the life of the apparatus 200. The information received in the signals may indicate both the affected elements 212 and the desired modification to said elements 212. The information may take any form, although in one example they may take the form of a structured data file such as an extensible markup language (XML) formatted file. In other cases, the information may include computer executable code, e.g., firmware updates, programs, object files, applets, scripts, etc.

One functional component contained within module 230 is represented by network access component 232. The network access component 232 may deal with any aspects related to reaching a centralized entity (e.g., entity 112 in FIG. 1) via a network for purposes of retrieving information from a provisioning service for customizing the device. These network aspects may include, but are not limited to, network discovery, routing, address lookup, transport, and/or application level protocols (e.g., HTTP, HTTPS, FTP, etc.). It should be noted that, while the device 200 may include a network interface (e.g., WiFi adapter), there may be alternate connection means that the device 200 could use to access the centralized entity 112. For example, another device such as smart phone, portable network adapter, home computer, etc., could act as a network proxy for the device 200. This secondary device could communicate with the device 200 through common data transfer interfaces such as USB, Bluetooth, infrared data association (IrDA), powerline networking, etc.

Once the network access module 232 has enabled communication with a centralized entity 112, a database access module 234 can interact with the entity 112 for purposes of querying, retrieving, parsing, locally storing, and locally applying customization. The database access module 234 may utilize any form of retrieval, such as file transfer requests, invoking Web Services methods (e.g., simple object access protocol, or SOAP), invoking methods via HTTP PUT/GET methods, structured query language (SQL) queries, etc. The database access module 234 will generally pass this information along to an execution module 236, which applies the retrieved information to the customizable elements 212.

The execution module 234 generally performs sequences of tasks related to applying and verifying changes to the customizable elements 212. These tasks may be customized for each device 200, although for efficiency it may be preferable to utilize an interface layer (e.g., application program interface or API) that enables a common execution module 236 to work with a wide variety of products. Intermediary code, as represented by OEM adapter 238, can be prepared for each product to interface with custom hardware 202 and/or customizable elements 212 associated with the particular device 200.

While the illustrated adaptations to the device facilitate a wide range of modification, the OEM may want to ensure a default behavior/appearance that provides at least the advertised features and an appearance desired by the manufacturer. Default module 240 may include instructions and/or data that provides this default state. This module 240 may also act as a "safe" mode of operation, e.g., that can be defaulted to in the event of an error in modules 230 and/or elements 212. Finally, authentication module 242 can provide security. For example, the module 242 may ensure operation/activation any of the modules 240 and/or elements 212 is authorized. In the event some functions may require a payment or subscription, and so service provider may wish to make sure such features are not activated by unauthorized parties. The authentication/security module 242 may also be used to confirm integrity of hardware and software of the device 200, e.g., to detect and thwart attempts at tampering with the device 200.

In another configuration, the authentication module 242 may also facilitate storing and accessing a unique identifier of the device (e.g., serial number). The unique identifier may be stored in persistent storage 206 during manufacture (e.g., firmware or hardware encoded) and is later used for receiving configuration data from a provisioning service. The module 242 may provide a way of ensuring an alternate identifier cannot be used. For example, although a MAC address can be unique, it can sometimes be changed (e.g., via a driver) through what is sometimes referred to as MAC address cloning. In such a case, the module 242 (or equivalent function) can ensure that the correct identifier is sent to a provisioning service even if the MAC address of the network interface has been altered for purposes of network communications.

Figure 3:
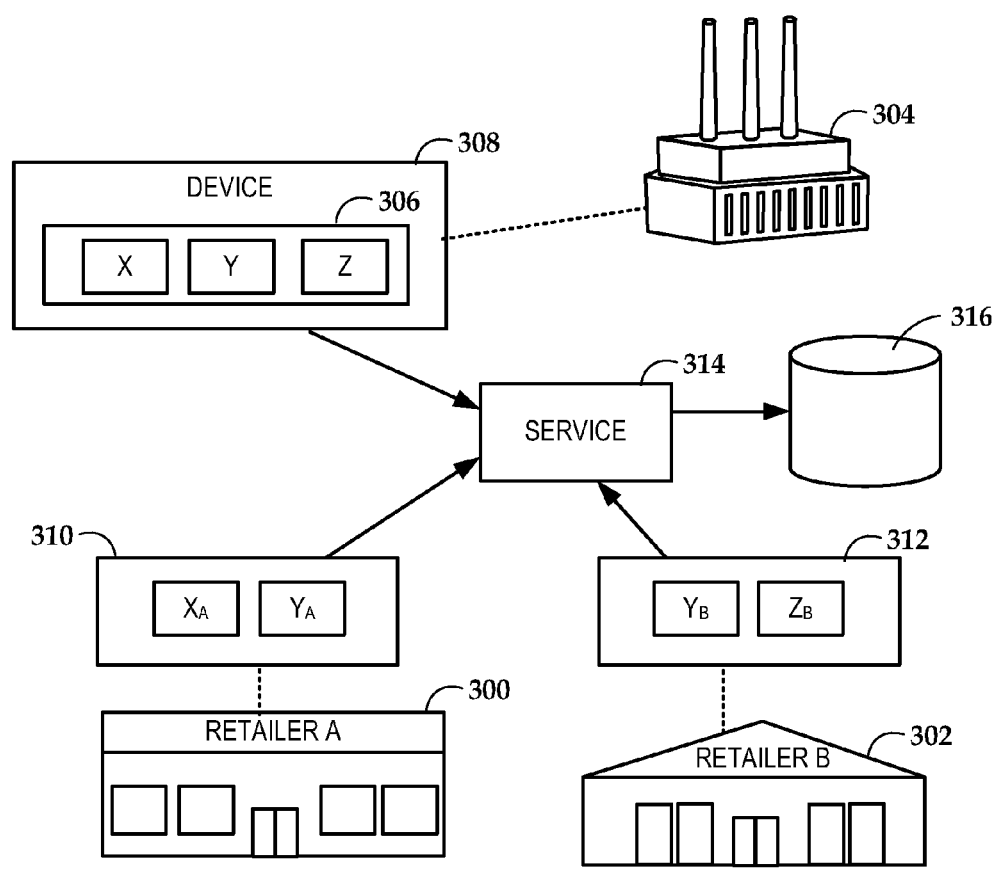
FIG. 3 is a block diagram illustrating a procedure for initially establishing service parameters for a device according to an example embodiment.

In reference now to FIG. 3, a block diagram illustrates an example process according to an example embodiment. The process begins with one or more retailers 300, 302 and manufacturer 304 agreeing to what elements 306 of a device 308 can be customized. Retailers 300, 302 may choose respective sets 310, 312 of customization options. For example, the retailers 300, 302 may want to have respective GUI service interfaces $Y_A$, $Y_B$ in a user interface of device 308 that directs the consumer to the retailer's phone number or website for service. Retailer 302 may prefer to have one content service X enabled or emphasized while disabling or deemphasizing another content service provider using setting $X_A$. Retailer 304 may prefer a functional component Z of the device 308 enabled/disabled per setting $Z_B$.

Any number of customizable attributes 306 can be enabled into the device 308 by the manufacturers prior to shipment. The retailers 300, 302 can choose which of these attributes can be changed and what they can be changed to through the use of the embodiments described herein. If the retailers 300, 302 make no choice as to a particular option, then the OEM can provide defaults (e.g., elements X, Y, Z in 306 may represent OEM defaults). The retailers 300, 302 and/or manufacturer(s) 304 can register these elements (and descriptions thereof) in a centralized service 314. For example, the manufacturer 304 may predefine the description of the customizable elements 306, as well as allowable values of those elements 306. For example, GUI service interface Y may be configured by providing a data file in an acceptable format (e.g., markup language, digital image, etc.). The service provider option X and functional component Z may be defined (e.g., in a markup language document) using selectable parameters, e.g., "enabled," "disabled," "first listed," etc. This agreement between the 300, 302 and/or manufacturer(s) 304 can be used to establish and/or populate a database 316.

During the retail sales process, a procedure is used by each retailer to track which devices have been sold by the retailer. An example of this procedure is shown in the block diagram of FIG. 4. In response to a particular transaction, e.g., a sale of device 400, a unique identifier 402 of the device 400 is captured. In the illustrated example, the identifier 402 is a bar code that can be captured at a point of sale terminal 403, e.g., using an optical scanner. The identifier 402 may be captured in other ways, such as radio frequency identifier (RFID) tag, optical character recognition, manual entry, etc. The identifier 402 may be used alone, or in combination with another identifier 404, and is generally intended to ensure data pertaining to the device 400 can be positively identified via a network service.

In some situations, the identifier 402 may be considered globally unique, e.g., it is unlikely two items will have the same identifier regardless of the type of item. This may be the case where the identifier 402 is a physical MAC layer address, for example. Uniqueness of a MAC address may be enforceable by way of the address range assigned to the manufacturer, and further by how the manufacturer assigns the addresses within that range. A serial number used as identifier 402 may or may not be globally unique. For example, it may be difficult for manufacturers to ensure unique serial numbers, as there may be no central entity that governs serial numbers in a way similar to MAC addresses. However, so long as the identifier 402 is unique for at least the particular type/model of device 400, a second identifier 404 may be used in combination with unique identifier 402 to ensure the device can be uniquely identified for purposes of customization described herein. The secondary identifier 404 may include any one or more of part number, model number, SKU, version number, etc. In the description that follows, the description of the unique identifier 402 is understood to optionally include the secondary identifier 404.

The device identifier data 402 can be captured at the time of sale and sent via a network to service 314 described in FIG. 3 that has knowledge of prior agreements between manufacturers and distribution entities (e.g., retailers) regarding types of devices, of which device 400 is a member. The service 314 may include an affiliation of separate services, and different activities can be sent to different entities (e.g., services, providers) within that affiliation. Generally, the service 314 will store the communicated identifier 402 into a database 316, which may itself be a distributed and/or affiliated group of services.

Another piece of information that may be expressly or inherently communicated to the service 314 regarding the transaction is an identifier 408 of the entity (e.g., retailer) to which the transaction pertains. This identifier 408 may be expressly communicated with the identifier 402 during the event, or may be inferred, e.g., by the channel of communication used to communicate the device identifier 402. As shown by way of example SQL INSERT statement 410, the transaction results in a linkage being created between the device identifier 402 and the entity identifier 408. This linkage 410 could also be made inherently, e.g., the retailer could have a dedicated table to which device identifiers 402 are added. Also, the linkage 410 need not be expressly made between device identifier 402 and entity identifier 408. For example, data describing a feature set for the device 400 could be obtained using the identifiers 402, 408, and a table could list/link this feature set with the device identifier 402. Thus, while the entity identifier 408 is used to retrieve the feature set, the express linkage in such a case is made between the feature set and the device identifier 402, and not between the device identifier 402 and the entity identifier 408.

Figure 4:
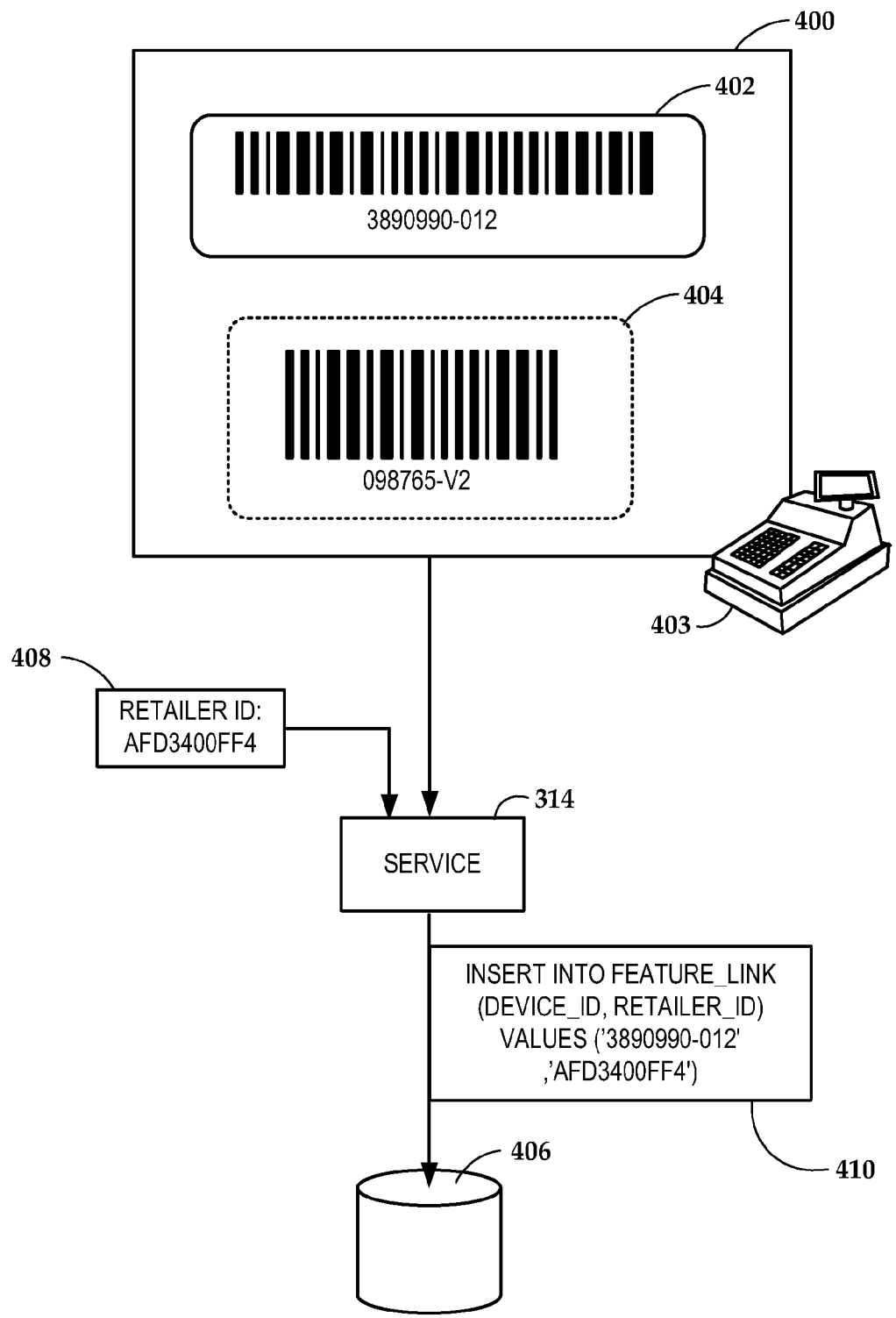
FIG. 4 is a block diagram illustrating a procedure for linking a device with an entity via a transaction according to an example embodiment.
Figure 5:
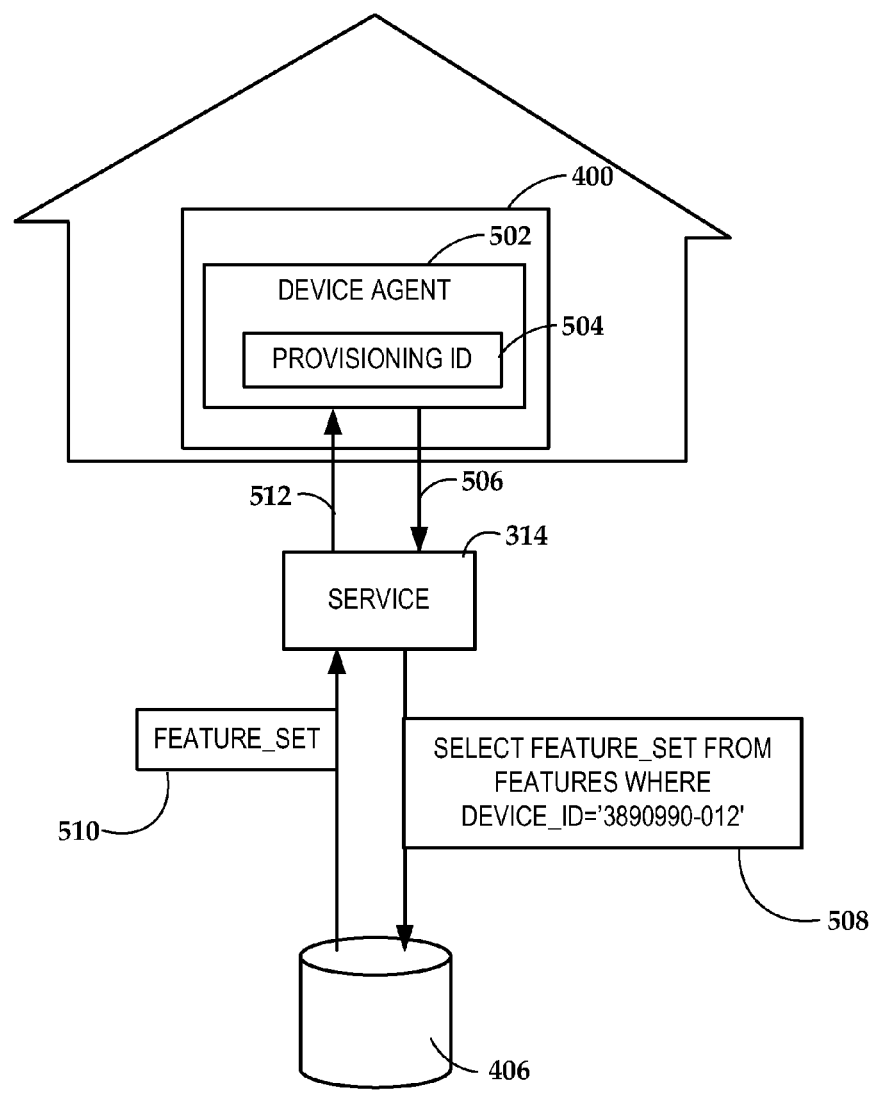
FIG. 5 is a block diagram illustrating a procedure for applying changes to a device upon initialization/connection according to an example embodiment.

In reference now to FIG. 5, a block diagram illustrates additional network interactions between device 400 and service 314 that occur after the transaction described in FIG. 4. After the transaction, a software component in the device 400 (referred to here as the device agent 502) enables the device 400 to register or connect with a provisioning function of service 314 upon initial connection of the device 314 to the Internet, or based on establishment of any other two-way communication. The device agent 502 may include functions the same as or similar to module 230 shown in FIG. 2.

The device agent 502 can determine to what provisioning service 314 to which the device 400 can connect. For example, the device agent 502 may be pre-configured with a built-in provisioning service identifier 504 (e.g., URL). In other configurations, the device agent 502 may use network service discovery to determine some or all aspects of the service's identity. Upon initialization/connection of the device 400, the device agent 502 registers 506 the device 400 with the provisioning service 314. The registration 506 may involve sending a unique identifier associated with the device 400 so that the previously entered linkage data (e.g., via statement 410 in FIG. 4) can be obtained. This unique identifier may include device identifier 402 shown in FIG. 4, or may be a new identifier, e.g., a hashed and/or encrypted value based on identifier 402 and/or other data that can be stored on the device 400 at the time it is manufactured.

As represented by SQL query 508 to database 316, the provisioning service 314 determines a feature set 510 associated with the device 400. This feature set 510 is determined by linkage in the database 406 of the retailer that sold the device 400. The feature set 510 is also based on the set of rules established by the manufacturer and the retailer for this device 400. Additional features may be included in set 510 that may have occurred after the manufacturer and retailer established the rules. For example, the features may include a general purpose channel/feature for providing bargains, advertising, offers, etc. via device 400, but the actual content of that channel/feature may not be established until the transaction in FIG. 4 takes place, and may be different for different end devices sold from the same retailer based on the context of the transaction (e.g., other purchases, time, location, method of payment, device status, device interfaces, connected device status, learned demographic information, etc.).

The provisioning service 314 applies 512 the changes to the device 400 via the Internet or using any other two-way communications. This may involve the device 400 verifying, parsing, and applying communicated data (e.g., feature set 510) to internal storage. This data 510 may be directly used to modify the device 400, and/or may be used to activate data already stored on the device 400. After application of the data 501, the device 400 has is enhanced and customized to the retailer's needs. This customization occurs without the manufacturer having to do it in the factory, and without the manufacturer having to inventory several different SKUs of the same product, each customized for a different retailer. The customized attributes can be fixed for all devices in a device group and/or can be defined on a per device basis based on services sold with the device or promotions which apply to the device at time of sale. The retailer can make changes to these attributes post sale as well based on whatever criteria they wish.

Figure 6:
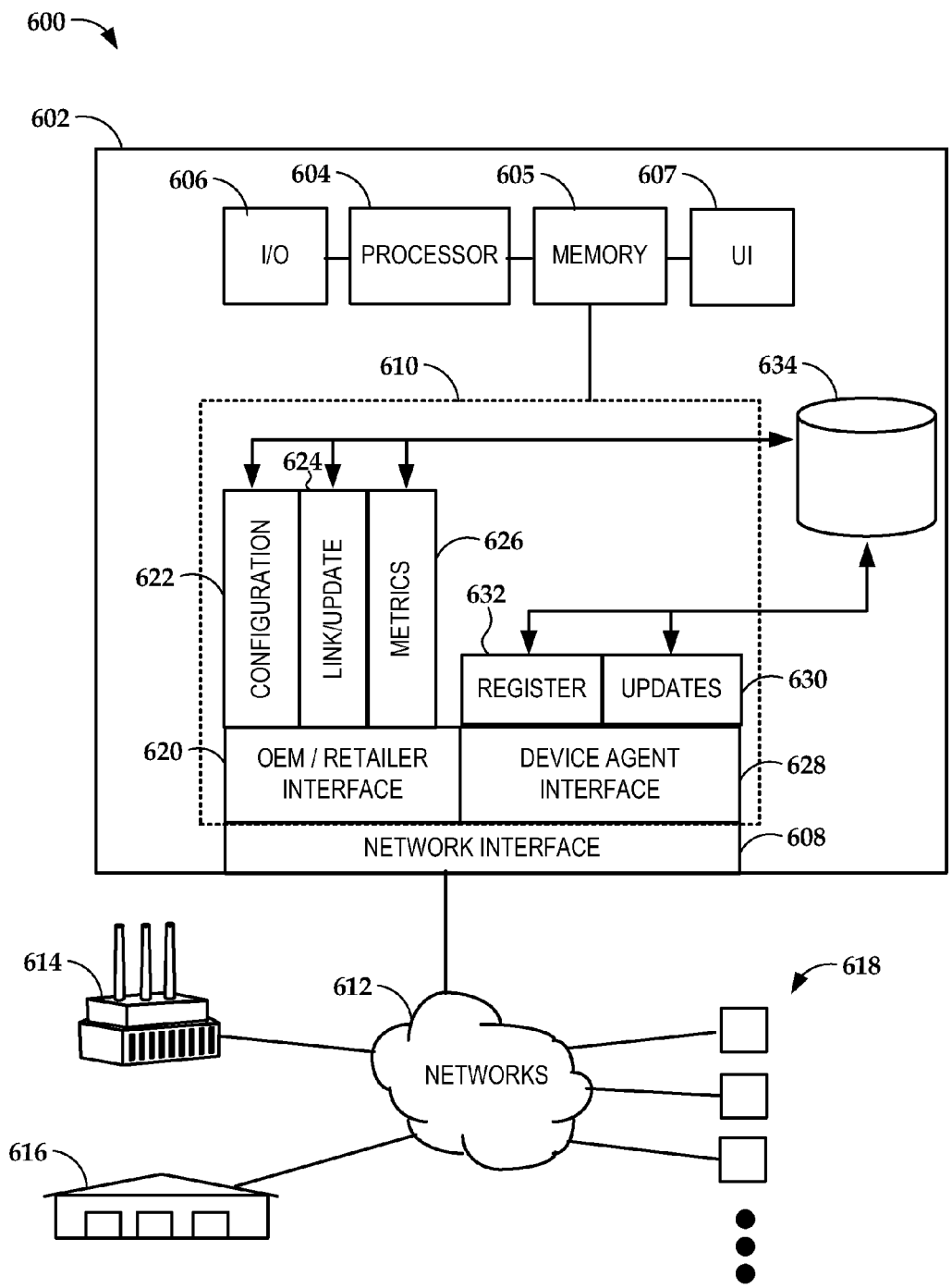
FIG. 6 is a block diagram of a server apparatus and system according to an example embodiment.

In reference now to FIG. 6, a block diagram illustrates a service arrangement 600 according to an example embodiment. The service arrangement can be used to provide provisioning and customization services as previously described, e.g., regarding services 112 and 314. The service arrangement 600 may include one or more service apparatuses 602. The service apparatus 602 may include computing hardware such as a processor 604, memory 605, input/output hardware 606, user interface hardware 607, and network interface 608.

The memory 605 may include volatile memory (e.g., random access memory, or RAM) and non-volatile memory (e.g., hard disk drives, solid-state drives, optical media, etc.). The memory 605 can store instructions, represented as operational software 610, which are operable by the processor 604 to perform functions described herein. It will be understood that operations performed by software 610 may be implemented in whole or in part in hardware and/or firmware, and description of functions being performed by software is not intended to be limiting.

As illustrated, the apparatus is coupled to one or more networks 612 via network interface(s) 608 for communication with manufacturers 614, supply chain intermediaries 616, and consumer electronic devices 618. The interactions described between the service arrangement 600 and entities/devices 614, 616, 618 may also occur via other data transfer interfaces, including local I/O ports 606 and user interface 607. Generally, the modules shown as part of software 610 facilitate these communications independently of the actual communication paths used.

The software 610 includes one or more OEM/retailer interfaces 620 that provide a common layer usable by manufacturers 614 and intermediaries for managing customization features such as previously described regarding FIGS. 1, 3 and 4. This module 620 may be used for function-independent aspects of communications, such as data transport protocols, authentication, etc. The interface module 620 can pass control to other modules for performing specific tasks. For example, a configuration module 622 may facilitate establishing, modifying, and deleting customization attributes for particular devices for which agreements have been newly established. This module 622 may establish and/or modify tables of a database 634 used to centrally manage the customization attributes. Either or both of the manufacturer 614 and intermediaries 616 may be able to manage data via this module 622.

A linkage/update module 624 may be used by manufacturer 614 and/or intermediaries 616 to maintain in-process data related to individual devices and/or classes of devices that have been previously established via configuration module 622. For example, module 624 may handle linking of purchases and other transactions to particular devices 618, such as CE devices described in FIGS. 1-5. This module 624 may also be used to push updates to those devices 618 after initialization. A metrics module 626 may be able to track statistics related to device linkages, activations, etc., that may be of interest to both manufacturers 614 and intermediaries 616.

A separate interface 628 may be used to interact with devices 618 during initialization and possibly thereafter. As with interface 620, this interface 628 may deal with common connection tasks such as establishing connections, data transport, authentication, etc. A registration module 632 may handle device-initiated signaling that indicates the devices 618 are ready to receive and initial configuration. An update module 630 may be used to apply updates 618 to devices thereafter, either upon request of the devices 618 or pushed to the devices 618 from the service arrangement 600.

Generally, the arrangement 600 facilitates centralized operations associated with customizing individual devices 618. Customization attributes for each device or device group (e.g., content services, support services, and/or other content that may be installed or enabled on the device) can be stored in database 634 for later retrieval. At any point during or after a sales transaction, the database information regarding the device 618 and the attributes associated with the customization of the device 618 is transmitted or otherwise made available for use to the provisioning service 600 when processing the device registration request. One option is for a database of information to be stored locally (e.g., with retailer or other intermediary that processed the transaction) and then made available to the party responsible for customization of the device (e.g., via a network service provided by the intermediary). Another option is for the data to be transmitted to the customization service provider during or after the sales transaction.

At any time after the sales transaction concludes and a device 618 is setup for use, the device 618 establishes a connection with the provisioning service 600. This process is referred to as device registration. As part of the registration, or in a process that follows registration, the provisioning service 600 utilizes the retail database 634 to determine what customization should be applied to the device 618 based on the rules setup for the customization. The provisioning service 600 initiates the activities necessary to enable/disable, activate/deactivate, install/uninstall, update or otherwise change the device 618 to support the desired customization needs.

For purposes of illustration, the operation of the devices is described in terms of functional circuit/software modules that interact to provide particular results. Those skilled in the art will appreciate that other arrangements of functional modules are possible. Further, one skilled in the art can readily implement such described functionality, either at a modular level or as a whole, using knowledge generally known in the art. The computing structures are only a representative example of devices and services that enable customizing CE devices as described herein. For example, the functions of the service arrangement 600 can be distributed over a large number of processing and network elements, and can be integrated with other services, such as Web services, gateways, mobile communications messaging, etc. For example, the functions of the service arrangement may be distributed between any combination of the manufacturer 614, one or more intermediaries 616, and a third party.

Figure 7:
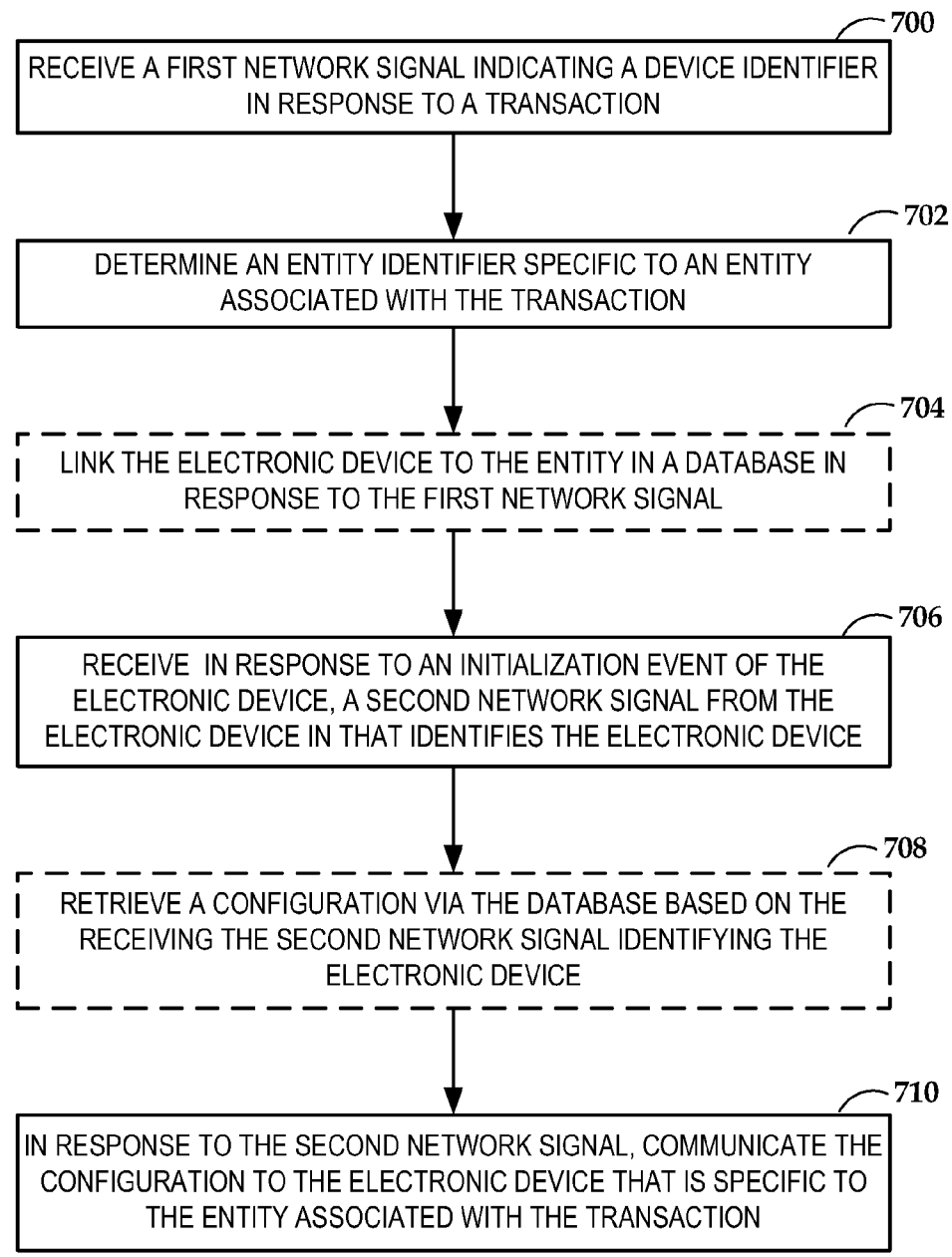
FIG. 7 is a flowchart illustrating a provisioning service procedure according to an example embodiment.

In reference now to FIG. 7, a flowchart illustrates a procedure according to an example embodiment. A first network signal is received 700 indicating a device identifier, e.g., in response to a transaction involving an electronic device uniquely associated with the device identifier. The device identifier may include at least one of serial number and a media access control address. The first network signal may include additional data related to the transaction that is used to modify the configuration of the electronic device specific to the transaction. The additional data may include data describing an additional transaction related to the electronic device.

At 702, an entity identifier specific to an entity associated with the transaction is determined. The entity may include a retailer and/or any other intermediary in the supply chain. In response to these previous operations 700, 702, the electronic device may optionally 704 be linked to the entity in a database in response to the first network signal.

In response to an initialization event of the electronic device, a second network signal is received 706 from the electronic device that identifies the electronic device. In response to the second network signal, a configuration may optionally be retrieved 708 via a database. In whatever way the configuration may be obtained, the configuration is communicated 710 to the electronic device that is specific to the entity associated with the transaction.

Figure 8:
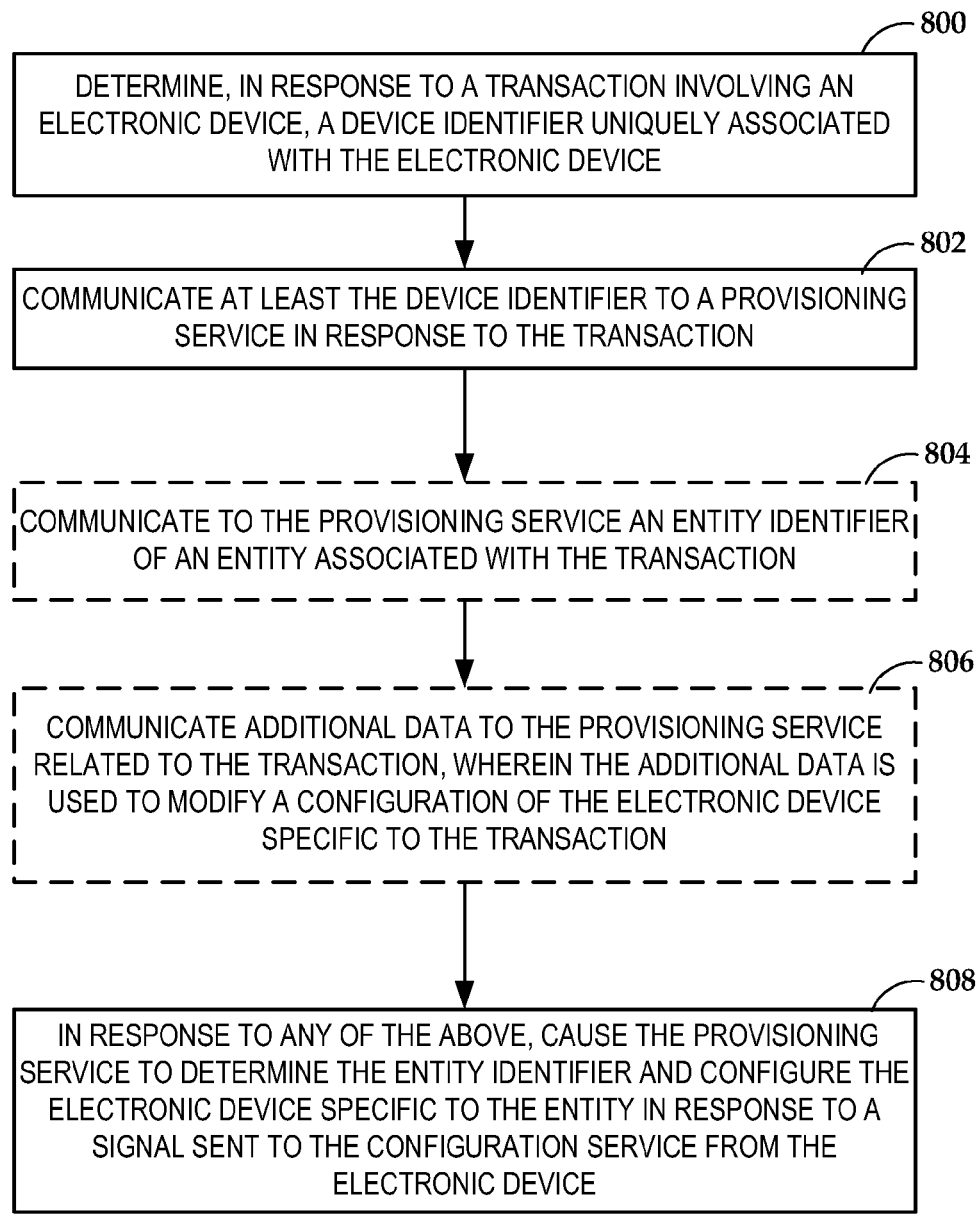
FIG. 8 is a flowchart illustrating a service procedure according to another example embodiment

In reference now to FIG. 8, a flowchart illustrates a procedure according to another example embodiment. In response to a transaction involving an electronic device, a device identifier uniquely associated with the electronic device is determined 800. The device identifier may include at least one of serial number and a media access control address. At least the device identifier is communicated 802 to a provisioning service in response to the transaction. An entity identifier of an entity (e.g., a retailer) associated with the transaction may optionally be communicated 804 to the provisioning service.

Additional data related to the transaction may also be optionally communicated 806 to the provisioning service. The additional data is used to modify a configuration of the electronic device specific to the transaction. The additional data may include data describing an additional transaction related to the electronic device. The additional transaction may include any of: a purchase of a service contract related to the electronic device; content usable by the electronic device; a network service usable by the electronic device; and a second device usable with the electronic device.

At least one of these communications 802, 804, 806, causes 808 the provisioning service to determine the entity identifier and configure the electronic device specific to the entity in response to a signal sent to the configuration service from the electronic device.

The foregoing description of the example embodiments has been presented for the purposes of illustration and description. It is not intended to be exhaustive or to limit the inventive concepts to the precise form disclosed. Many modifications and variations are possible in light of the above teaching. It is intended that the scope of the invention be limited not with this detailed description, but rather determined by the claims appended hereto.

The invention claimed is:

1. A first electronic device comprising:
   a data storage medium configured during manufacture to store at least a first device identifier that distinguishes the first electronic device from other devices of the same type, and additional information indicating a second electronic device interoperable with the first electronic device;
   a hardware processor configured to cause the first electronic device to:
      determine an initialization event;
      in response to the initialization event, send a network signal to a provisioning service, wherein the network signal communicates at least the identifier and the additional information;
      receive a device configuration in response to the network signal, wherein the device configuration is specific to an entity in a supply chain through which the first electronic device traveled, and wherein the first device identifier is linked to the entity via the provisioning service in response to a transaction occurring in the supply chain, the device configuration to program the first electronic device to interoperate with the second electronic device in response to the initialization event; and
      apply the device configuration to the first electronic device.

2. The first electronic device of claim 1, wherein the initialization event includes at least one of a first power-on of the first electronic device and a first connection to a network by the first electronic device.

3. The first electronic device of claim 1, wherein the device configuration customizes at least one of a user interface and an operational function of the first electronic device as specified by the entity.

4. The first electronic device of claim 3, wherein the device configuration customizes the user interface to display any combination of contact information and graphical information associated with the entity.

5. The first electronic device of claim 1, wherein the network signal includes at least one of a hashed or an encrypted value derived from the first device identifier, the at least one of the hashed or the encrypted value linked to the entity via the provisioning service.

6. The first electronic device of claim 1, wherein the first device identifier includes a media control address.

7. A method comprising:
   storing, on a data storage medium during manufacture of a first electronic device, at least a device identifier that distinguishes the first electronic device from other devices of the same type, and storing additional information indicating a second electronic device interoperable with the first electronic device;
   determining, by executing an instruction with a processor in the first electronic device, an initialization event;
   in response to the initialization event, sending, by executing an instruction with the processor, a network signal to a provisioning service, wherein the network signal communicates at least the identifier and the additional information;
   receiving, at the first electronic device, a device configuration in response to the network signal, wherein the device configuration is specific to an entity in a supply chain through which the first electronic device traveled, and wherein the device identifier is linked to the entity via the provisioning service in response to a transaction occurring in the supply chain, the device configuration to program the first electronic device to interoperate with the second electronic device in response to the initialization event; and
   applying the device configuration to the first electronic device.

8. The method of claim 7, wherein the initialization event includes at least one of a first power-on of the first electronic device and a first connection to a network by the first electronic device.

9. The method of claim 7, wherein the device configuration customizes at least one of a user interface and an operational function of the first electronic device as specified by the entity.

10. The method of claim 9, wherein the device configuration customizes the user interface to display any combination of contact information and graphical information associated with the entity.

11. The method of claim 7, wherein the network signal includes at least one of a hashed or an encrypted value derived from the device identifier, the at least one of the hashed or the encrypted value linked to the entity via the provisioning service.

12. The method of claim 7, wherein the device identifier includes a media control address.

13. A non-transitory computer-readable storage medium comprising instructions thereon that when executed by a processor, causes the processor to:
store, on a data storage medium during manufacture of a first electronic device, at least a device identifier that distinguishes the first electronic device from other devices of the same type, store additional information indicating a second electronic device interoperable with the first electronic device;
determine an initialization event;
in response to the initialization event, send a network signal to a provisioning service, wherein the network signal communicates at least the identifier and the additional information;
receive, at the first electronic device, a device configuration in response to the network signal, wherein the device configuration is specific to an entity in a supply chain through which the first electronic device traveled, and wherein the device identifier is linked to the entity via the provisioning service in response to a transaction occurring in the supply chain, the device configuration to program the first electronic device to interoperate with the second electronic device in response to the initialization event; and
apply the device configuration to the first electronic device.

14. The non-transitory computer-readable storage medium of claim 13, wherein the initialization event includes at least one of a first power-on of the first electronic device and a first connection to a network by the first electronic device.

15. The non-transitory computer-readable storage medium of claim 13, wherein the device configuration customizes at least one of a user interface and an operational function of the first electronic device as specified by the entity.

16. The non-transitory computer-readable storage medium of claim 15, wherein the device configuration customizes the user interface to display any combination of contact information and graphical information associated with the entity.

17. The non-transitory computer-readable storage medium of claim 13, wherein the network signal includes at least one of a hashed or an encrypted value derived from the device identifier, the at least one of the hashed or the encrypted value linked to the entity via the provisioning service.

18. The non-transitory computer-readable storage medium of claim 13, wherein the device identifier includes a media control address.

19. The first electronic device of claim 1, wherein the second electronic device is a set top box.

* * * * *